(No Model.)

A. C. FENETY.
Method of and Apparatus for Producing Outlines.

No. 239,322.  Patented March 29, 1881.

Witnesses.  Inventor.

UNITED STATES PATENT OFFICE.

ANDREW C. FENETY, OF BOSTON, MASSACHUSETTS, ASSIGNOR TO HOBART LINTON, OF SAME PLACE.

METHOD OF AND APPARATUS FOR PRODUCING OUTLINES.

SPECIFICATION forming part of Letters Patent No. 239,322, dated March 29, 1881.

Application filed December 10, 1880. (No model.)

*To all whom it may concern:*

Be it known that I, ANDREW C. FENETY, of Boston, in the county of Suffolk and State of Massachusetts, have invented an Improved Method of and Apparatus for Producing Outlines, of which the following is a specification.

This invention has for its object to enable an accurate outline copy of a photograph or other picture or object to be quickly produced on a paper or other surface on which a copy of such picture or object is to be made.

The invention is intended particularly for the use of artists in making enlarged portraits from photographs; and it consists in the hereinafter-described process and apparatus for producing outlines.

I will first generally describe the nature of the process, explaining afterward the apparatus used in carrying it into effect.

An image of the photograph or other picture or object to be copied is thrown, by means of a suitable lens, upon a plate of ground glass or other suitable translucent material capable of showing the image upon its back side and of receiving crayon or other marks, as hereinafter described. The outlines of the image are then traced or sketched on the back side of the glass (or the side farthest from the lens) with a soft crayon or other suitable marking material. A sheet of paper to receive the outlines is next placed against the side of the glass on which the outlines are sketched and is pressed against the glass with a rubbing pressure until the outlines sketched on the glass are partially transferred to the paper. The outlines thus produced are the reverse of the outlines of the picture or object, and can be transferred to a second sheet, so as to present the proper appearance, by bringing the sheet receiving the outlines from the glass against the second sheet, thereby retransferring the outlines formed on the glass, and forming accurate outlines on the paper on which the picture is to be made. The dry-marking material is of such nature that it will yield outlines that are not too conspicuous, and can be readily removed from the picture, if desired.

The apparatus employed is represented in the accompanying drawings, forming a part of this specification, in which—

Figure 1:
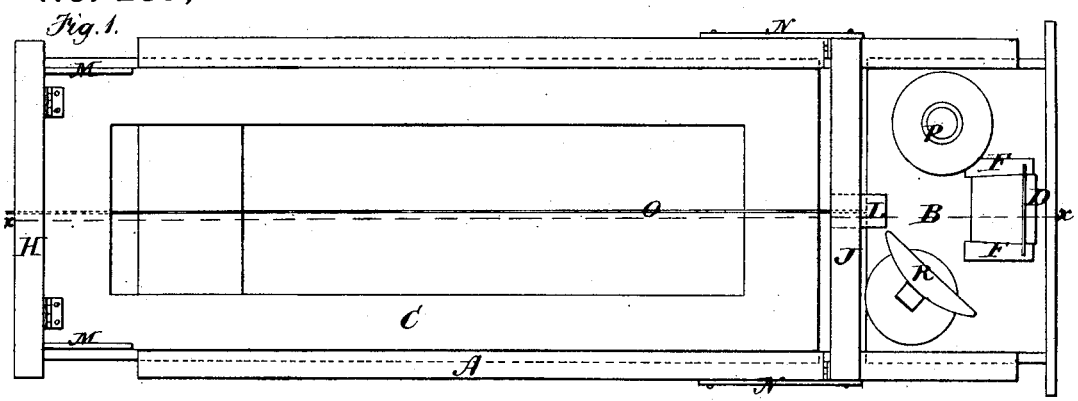
Figure 2:
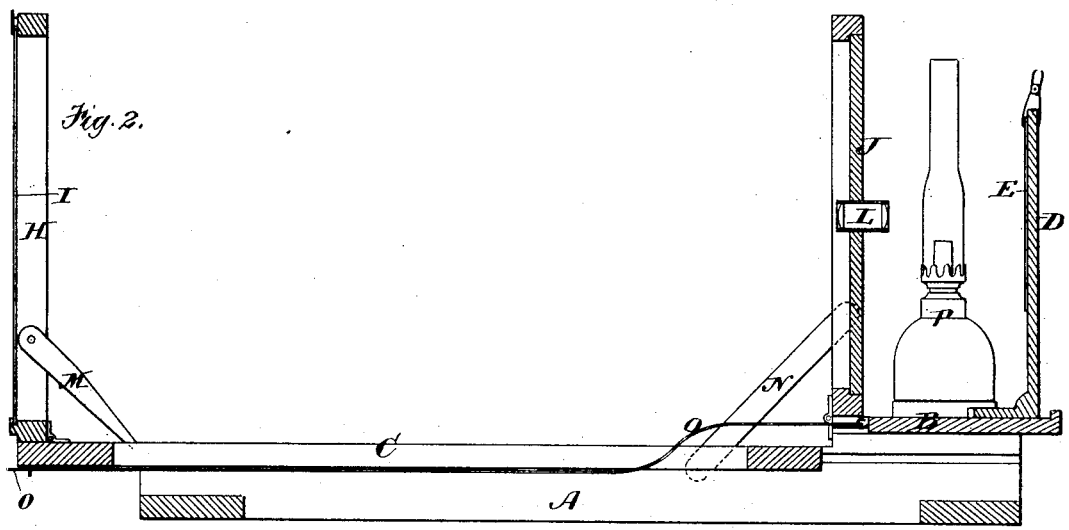
Figure 3:
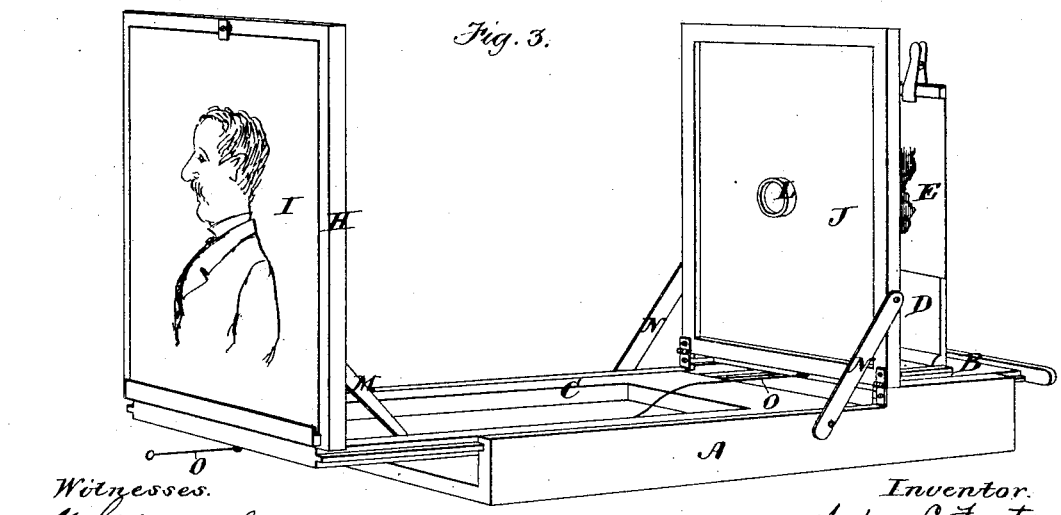

Figure 1 represents a top-plan view of said apparatus; Fig. 2, a section on line *x x*, Fig. 1, and Fig. 3 a perspective view.

The same letters of reference indicate the same parts in all the figures.

In the drawings, A represents a suitable base or support having in its sides grooves or ways for the slides B C, which are movable independently of each other. The slide B is sufficiently large to enable it to support a lamp and a reflector, as hereinafter described, and is provided with a support, D, for a photograph, E, or other object, said support being, in the present instance, an L-shaped piece with its shorter arm inserted between two dovetailed guides, F F, on the slide B, and removable from said guides. The slide C is provided with a frame, H, to support the ground-glass plate I, the frame being provided with any suitable means for holding and permitting the removal of the plate I.

J represents a frame or support attached to the base A, and located between the frame H and support D. The support J consists of a plate or board having a central aperture in which is inserted a lens, L, adapted to throw an image of a photgraph or object on the support B upon the glass plate I. I prefer to use a lens of the kind used by photographers in focusing on a ground-glass plate the image of the subject to be photographed. The frame H and support J are hinged, respectively, to the slide C and base A, so that they can be turned down, when not in use, to reduce the apparatus to compact form, and the support D can be removed from the slide B for the same purpose. The parts H J are supported in the positions shown in the drawings by pivoted braces M and N.

O represents a rod or handle connected to the slide B, and projecting to the rear of the frame H, to enable the operator to move the slide B so as to properly adjust the photograph with relation to the lens while standing behind the frame H.

The operation is as follows: The photograph or other object from which a picture is to be made is suitably secured to the support D and a strong light is thrown upon its front side by any suitable means. I have used a lamp, P, and a reflector, R, with good results, said lamp and reflector being placed on the slide B and moving with the photograph thereon. An image of the photograph or object is thrown by the lens upon the plate I, and the latter is preferably shielded, so that no light can fall upon it, excepting through the lens. The operator stands behind the plate I, and after obtaining the focus, by moving the slide B and regulating the size of the image on the plate by moving the slide C, proceeds to sketch or trace the image on the back side of the plate I with a crayon or other suitable dry-marking material capable of making a mark that can be partially transferred to a surface pressed against it. The plate I is placed on the frame H with its ground surface at the back or farthest from the lens. The ground side of the glass forms a favorable sketching-surface, taking the crayon or other sketching material as readily as paper, hence the outlines of the image can be easily and accurately sketched or traced. The sketching or tracing having been completed, the operator removes the plate I from the frame H, places a sheet of paper upon the surface of the glass on which the outlines have been sketched, and by applying a rubbing pressure partially transfers the outlines from the glass to the paper, thus producing upon the latter a reverse of the outlines on the glass and also of the picture or object. The transferred outlines can now be retransferred to a second sheet, on which the picture is to be made, by placing the first sheet upon the second and applying a rubbing pressure, thus producing outlines which are not reversed.

It will be seen that in this process accuracy and economy of time and labor are insured, no measurements nor erasures being required.

It is well known that by the usual methods of sketching enlarged outlines of a photograph it is very difficult to secure absolute accuracy, and much time is required in making measurements.

I regard any material which is capable of showing on its back side an image thrown upon its front side and of receiving crayon or other marks an equivalent of ground glass. Certain kinds of tracing-paper may be employed to good advantage.

I am aware that English Patent No. 13,726 of 1851 describes a method of making an enlarged or a reduced copy on ground glass of an outline-picture painted on a transparent plate, the picture being placed between a lamp and the ground glass, so that shadows of its outlines are thrown upon the ground glass through lenses which enlarge or diminish the outline. By this method no opaque picture like a photograph can possibly be copied, the method being adapted only for use with pictures painted on glass. Moreover, the outline is traced on the ground glass with a moist material or pencil, yielding a copy which would be conspicuous on white paper, and cannot be rubbed off without injury to the latter. My method, on the other hand, is adapted to opaque pictures, since I illuminate the front side of the picture, or the side nearest the ground glass, and use a lens adapted to throw upon the glass an image (not a shadow) of the picture. A dry-marking material is used, as before stated, yielding a copy which can be readily rubbed off and is not too conspicuous.

I claim as my invention—

1. The method of making outline copies of opaque pictures or objects, the same consisting in illuminating the front of the picture or object, throwing an image of the same upon a shaded ground-glass plate by a suitable lens, tracing the outlines of the image on the back of said plate with suitable dry-marking material, transferring the outlines thus obtained to a sheet of paper to obtain reversed outlines, and retransferring from said sheet to a second sheet to obtain outlines that are not reversed, the outlines yielded by the dry-marking material being inconspicuous and easily rubbed out, as set forth.

2. The apparatus consisting of the base A, the support J, having the lens L, the slide B, having the suport D, and adapted to support a lamp and reflector, and the slide C, having the ground-glass holder or frame H, all arranged and operating substantially as described.

3. The combination of the base A, the slide C, the frame H, hinged to said slide, and the lens-support J, hinged to the frame, as set forth.

4. In combination with the frame A, the lens-support J, and the frame or support H, the slide B, having the photograph-support, and provided with the rod or handle O, projecting toward or beyond the support H, as set forth.

5. In an apparatus of the kind herein described provided with a fixed lens, the slide B, having a support, D, and adapted to support a lamp and reflector, the support D, lamp, and reflector moving together toward and from the lens, as set forth.

In testimony whereof I have signed my name to this specification, in the presence of two subscribing witnesses, this 7th day of December, A. D. 1880.

ANDREW C. FENETY.

Witnesses:
  HOBART LINTON,
  C. F. BROWN.